United States Patent [19]

Griffith

[11] 4,164,020
[45] Aug. 7, 1979

[54] PROGRAMMABLE SOUND SYNTHESIZER

[75] Inventor: Robert C. Griffith, Encino, Calif.

[73] Assignee: Dynamic Sciences International, Inc., Woodland Hills, Calif.

[21] Appl. No.: 900,883

[22] Filed: Apr. 28, 1978

[51] Int. Cl.² ............................................... G06F 1/02
[52] U.S. Cl. .................................................. 364/718
[58] Field of Search ............ 364/718, 721; 179/1 SM; 84/1.01

[56] References Cited

U.S. PATENT DOCUMENTS

| 3,636,333 | 1/1972 | Klund | 364/721 X |
| 3,763,364 | 10/1973 | Deutsch et al. | 364/718 |
| 3,821,714 | 6/1974 | Tomisawa et al. | 364/718 |
| 3,822,380 | 7/1974 | Forgione | 364/718 |
| 4,078,465 | 3/1978 | Wheelwright | 84/1.01 |

Primary Examiner—David H. Malzahn
Attorney, Agent, or Firm—Blakely, Sokoloff, Taylor & Zafman

[57] ABSTRACT

A programmable sound synthesizer, controlled by a microprocessor, can be fabricated according to the present invention to provide arbitrary programmability with respect to the waveform of an audible tone, frequency, amplitude, envelope shape of the wave train, including attack, sustain and the decay intervals of the envelope, rest or space intervals between notes as well as arbitrary selection of the note within an ordered sequence. A plurality of binary numbers, which in sequence are indicative of the waveform of the tone to be generated, can be read from a memory at a rate which defines the frequency of the waveform. The memory is read by an address generator whose repetition rate is controlled by an integrater. The rate of integration is in turn controlled by a tone number which is programmed into an appropriate register coupled to the integrater. Envelope and amplitude information may also be programmed into corresponding registers. The waveform memory, envelope register and amplitude register are each coupled to the central processor and read synchronously to generate the complex selected tone.

10 Claims, 5 Drawing Figures

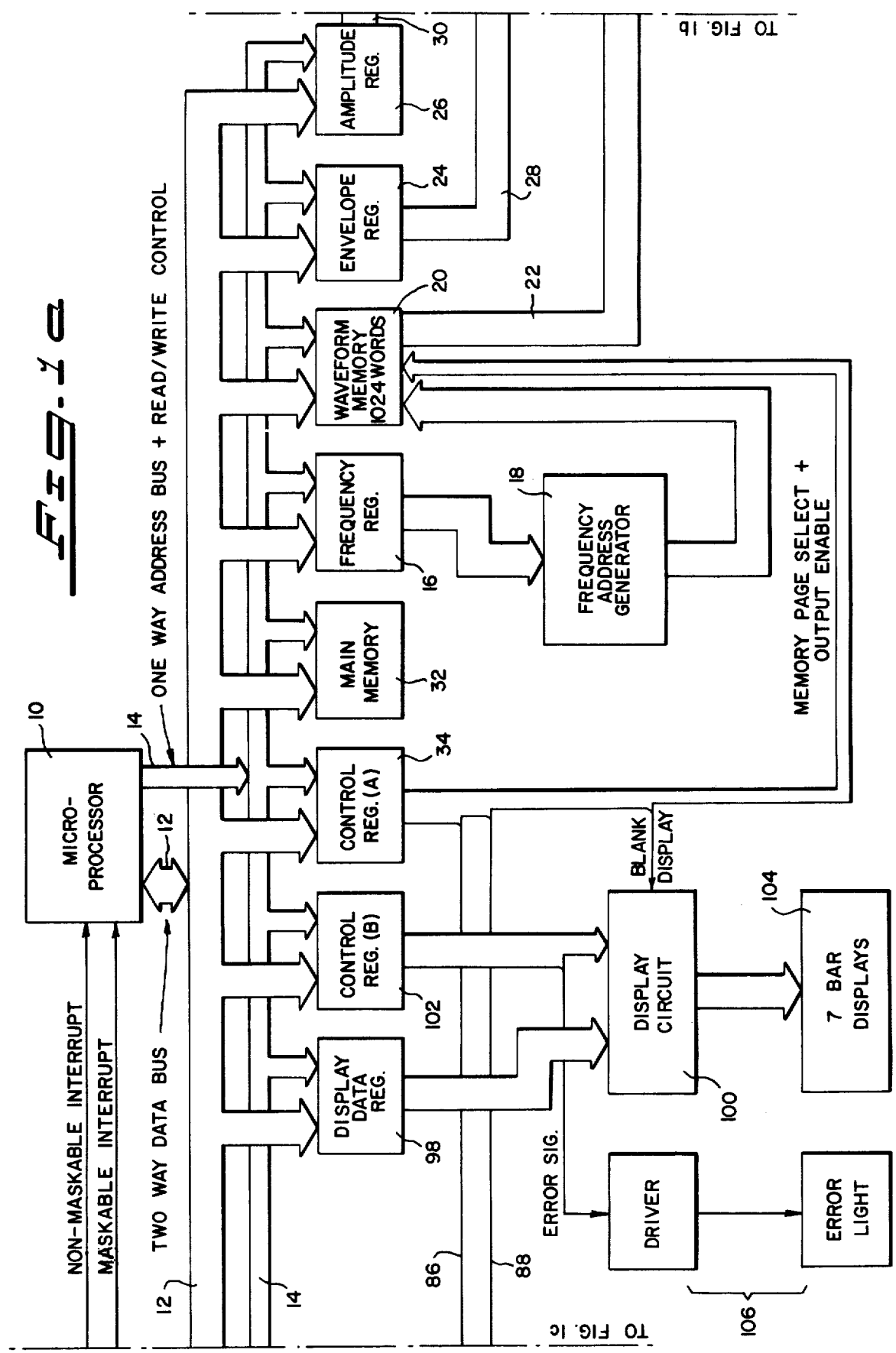

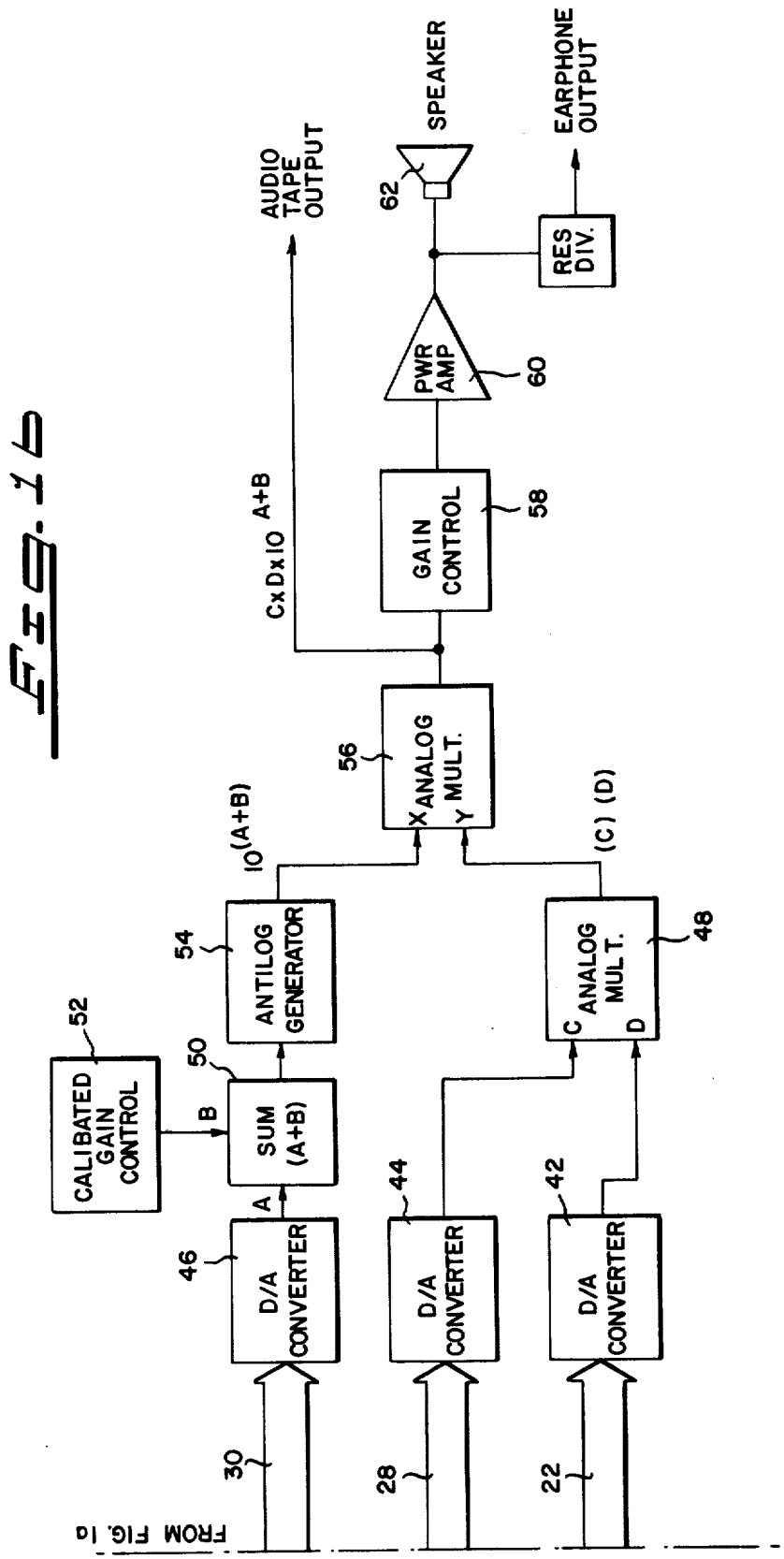

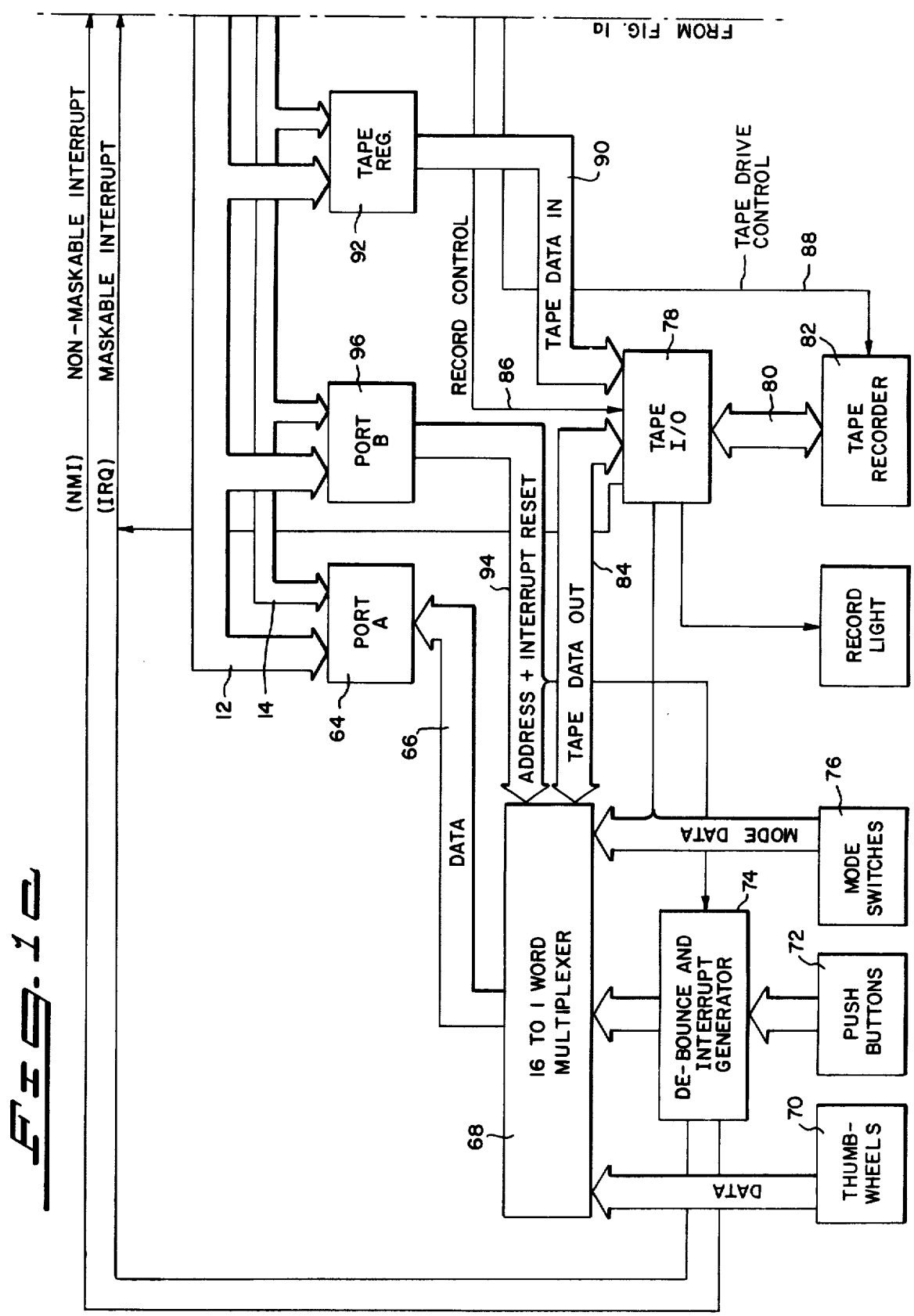

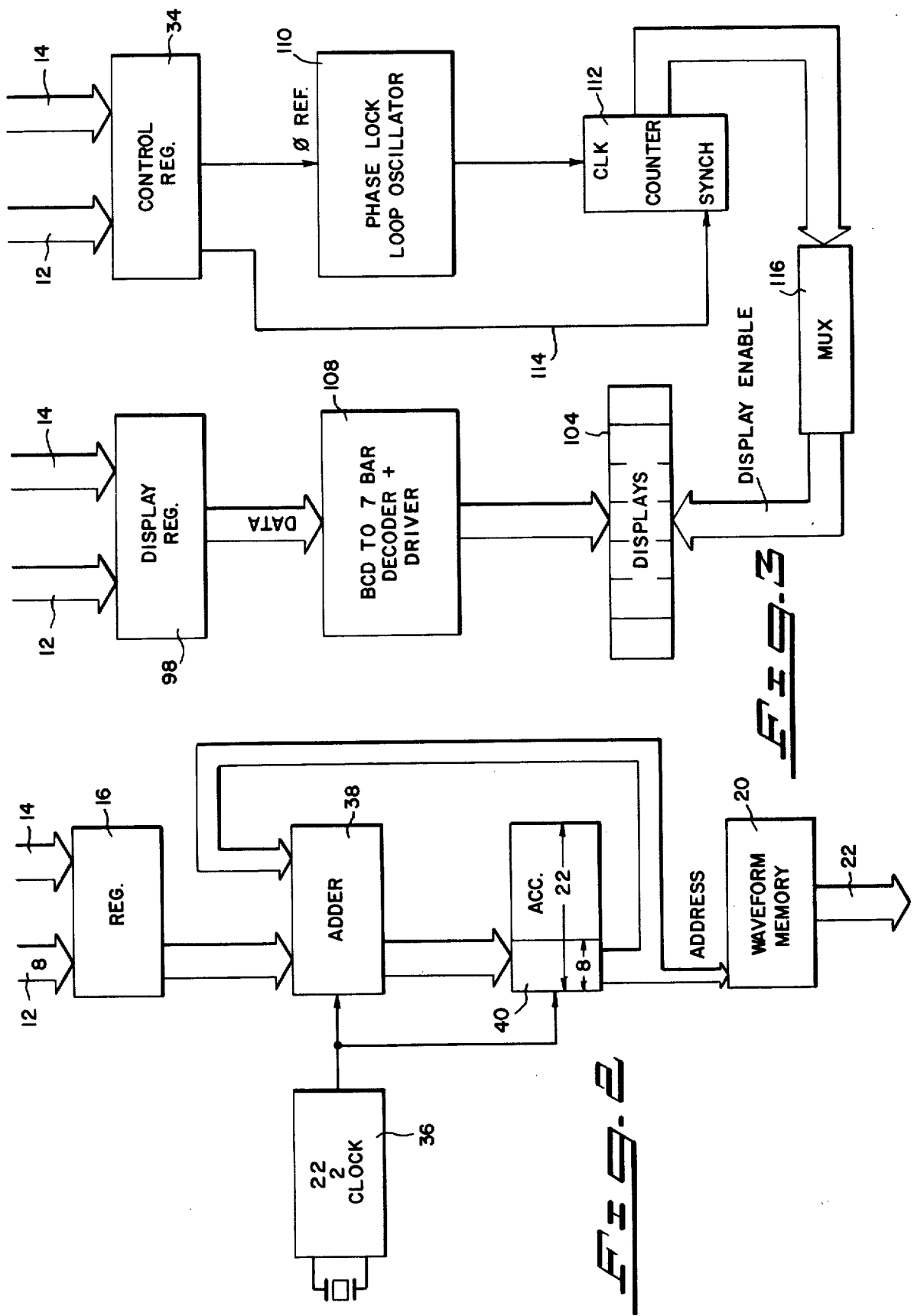

PROGRAMMABLE SOUND SYNTHESIZER

BACKGROUND OF THE INVENTION

1. Field of the Invention

The present invention relates to electronic circuits for the replication of musical tones and in particular relates to a programmable circuit for generating and manipulating sequences of complex tones.

2. Description of the Prior Art

Circuits for the synthesis of music have typically involved complex electromechanical combinations for the reproduction of musical sounds such as is disclosed in U.S. Pat. No. 2,940,351. In electronic musical instruments or sound synthesizers the musical tones are produced by a plurality of analog oscillators and analog wave-shaping circuits, or if implemented with digital circuitry, produce tones selectively read from a read-only memory coupled to a speaker through a digital-to-analog converter. Such circuits fail to incorporate any playback mechanism wherein after a series of tones have been entered they may be selectively played back or further manipulated. In other words, prior digital circuitry for electronic musical instruments or synthesizers generally incorporates a nonprogrammable, real time output.

A typical sound synthesizer, utilizing digital circuitry, such as in a speech synthesizer, involve circuits which use a control circuit to selectively draw fixed sound patterns from a memory for direct coupling through a digital-to-analog converter for audio reproduction as is disclosed in U.S. Pat. No. 3,641,496; 3,928,722; or 3,892,919. Words or sounds are thus synthesized by drawing from a fixed library of basic prestored sound elements and selectively combining the sound elements by fixed circuitry to obtain a digitized composite of the final sound. No provision is provided to programmably alter or manipulate the stored sounds.

Thus, musical compositions are generally composed in the mind of the composer, recorded on paper and manually played on an instrument capable of fixed tone characteristics, such as a piano. The true sound of the composition as produced by a live orchestra cannot be determined until actually played by the actual orchestra. The actual sound of the composition is predicted by the composer based only upon experience. Any reiterations of the composition can only be rendered through actual rehearsal performances. What is needed is an apparatus which can arbitrarily simulate a musical tone or sound and which will allow the composer to selectively alter the quality and characteristics of each tone in a reiterative process to obtain the desired orchestrated sound.

BRIEF SUMMARY OF THE INVENTION

The present invention is a programmable sound synthesizer which overcomes each of the shortcomings of the prior art. The present invention comprises a circuit for synthesizing a plurality of audible tones wherein the circuit has an input means for receiving instructions and an output means for generating an audible tone. The circuit comprises a central processor coupled to the input means. The central processor transfers and manipulates digital information in a selectively controlled and timed sequence in response to a program. A frequency register is coupled to the central processor and stores a binary tone number indicative of one of the plurality of audible tones. A frequency/address generator means generates a plurality of addresses at a rate in response to the tone number. The frequency/address generator means is coupled to the frequency register. A waveform memory means stores and selectively writes a plurality of binary words indicative of the waveform of the tone to be generated on an output data bus. The frequency/address generator means is coupled to the waveform memory means which writes the plurality of binary numbers in response to the plurality of addresses coupled thereto. The output data bus is coupled from the waveform memory means to the output means. The output means generates one of the plurality of audible tones in response to the plurality of binary numbers coupled to the output means. By this combination, the tone frequency is selectively determined by the rate at which the waveform memory means is read and the waveshape which is generated is determined by the stored contents within the waveform memory means.

The circuit may also include an amplitude register coupled to the central processor and an envelope register coupled to the central processor. The amplitude register stores a binary number indicative of the amplitude of the tone which is being generated while the envelope register stores a binary number indicative of the wave envelope of the tone to be generated. The amplitude and envelope registers are each coupled to the output means. Inasmuch as the waveform memory means, amplitude register and envelope register are each coupled to the central processor and synchronized therewith, a tone is produced on a real time basis in accordance with parameters stored within a main memory and accessible by the central processor. By programmably altering the parameters, the user is able to alter the waveshape of the tone, its amplitude, frequency and the shape of the wave envelope to obtain a substantially arbitrary tone, the characteristics of which are user manipulatable.

In one embodiment the stored parameters are scanned in a real time display to permit the user to reiteratively alter any selected tone in a sequence of ordered tones. The display includes a plurality of digits, which may be scanned synchronously with the central processor, for displaying various parameters of the addressed tone within the main memory. The multiple digit display is continuously scanned by an oscillator which runs independently of the central processor so that should the processor be halted, any one display digit will not be excessively overdriven and damaged.

These and other features of the preferred embodiments of the present invention are best understood by viewing the following figures in light of the detailed description of the preferred embodiments.

BRIEF SUMMARY OF THE DRAWINGS

FIGS. 1A through 1C are schematic diagrams of one circuit illustrating the basic concepts of the present invention;

FIG. 2 is a simplified block diagram illustrating in greater detail the frequency/address generator of the present invention; and FIG. 3 is a simplified block diagram illustrating one embodiment of the real time output scanning display circuitry.

DETAILED DESCRIPTION OF THE PREFERRED EMBODIMENTS

The present invention is a microprocessor programmable circuit for synthesizing an arbitrary musical tone and an arbitrary sequence of such tones. The central processor, subject to a program control, manipulates parameters of the tones. The parameters are stored in a random access memory which allows for arbitrary retrieval and reproduction. The parameters subject to manipulation include the frequency of the tone, the waveform or waveshape of the tone, the type of wave train envelope which modulates the tone, the attack, sustain, and decay intervals of the modulating envelope, amplitude of the tone and spaces between tones. The full audio range can be produced by a practical circuit which provides for a direct conversion between the binary parameter indicative of frequency and the analog frequency of the tone generated. The frequency of the waveform or waveshape which is generated is determined by the rate at which a waveform memory is read. This rate in turn is generated by an integrating circuit whose rate of integration is determined by the frequency parameter which is programmably selected.

Consider FIG. 1A which illustrates microprocessor 10 in combination with the main registers. Processor 10 performs data processing functions, controls various peripherals discussed below and performs required BDC conversions. Central processor 10 communicates with the other circuit elements of the present invention via a bidirectional data bus 12 and an address/control bus 14. In the presently illustrated embodiment microprocessor 10 is an eight bit circuit, in other words, the basic unit of information is an eight bit binary byte which is manipulated and processed as a unit. Data bus 12 is thus eight bits wide while address bus 14 is 16 bits. The microprocessor of the present invention is a conventional central processor well known to the art, such as is manufactured by MOS Technology, Inc. under the trademark KIM-1. Many other types of microprocessors employing similar or distinct word lengths or organizations could be used without departing from the scope and spirit of the present invention.

Data bus 12 and address/control bus 14 are coupled to a conventional frequency register 16. The output of frequency register 16 in turn is coupled to a frequency/address generator 18. In the presently illustrated embodiment, generator 18 is an integrator driven by a clock independent of the clock of microprocessor 10. As described below in greater detail, the rate at which generator 18 integrates is determined by the binary number or word stored within frequency register 16. The output of generator 18 is a sequential plurality of addresses which are coupled to the address input of a random access waveform memory 20. Memory 20 is also appropriately coupled to data bus 12 and address control bus 14. Thus, the contents of waveform memory 20 are loaded according to processor control into waveform memory 20 and selectively coupled to a waveform data bus 22 at a rate and in the sequence dictated by generator 18.

Similarly, an addressable envelope register 24 and amplitude register 26 are each appropriately coupled to data bus 12 and address/control bus 14. Envelope register 24 selectively stores a binary word indicative of the envelope which modulates the waveform read from memory 20. Similarly, amplitude register 26 stores a binary word indicative of the amplitude of the tone to be generated. Each of the registers 16, 24 and 26 are selectively loaded and clocked by appropriate control signals, well known to the art, originating in microprocessor 10. The output of envelope register 24 is coupled to an envelope and data bus 28 while an output amplitude word is coupled to an amplitude data bus 30. Thus, busses 22, 28 and 30 synchronously provide information pertaining to the waveform, envelope and amplitude of the tone to be generated as controlled by microprocessor 10. Microprocessor 10 also has busses 12 and 14 appropriately coupled to a random access main memory 32 and a first control register 34. Main memory 32 provides a memory for processor 10 for each of the parameters of a ordered series of tones. In the presently illustrated embodiment, a 4k random access memory, such as Advance Microdevices AM9102-2 is provided and permits the storage for parameters of up to 100 consecutive tones. Portions of waveform memory 20, each of which may in fact be part of main memory 32, may be selectively enabled by control register 34. In other words, the capacity of waveform memory 20 may be such as to include a plurality of distinct waveforms within separate memory blocks. Control register 34 provides a memory mapped address as a memory page select signal to permit programmable user selection of any one of the plurality of the memory blocks within waveform memory 20. Frequency/address generator 18 then generates a series of addresses which will address each of the locations within any given block selected by control register 34.

The generation of a given audible tone can be better understood by viewing FIG. 2 which shows frequency register 16, generator 18 and waveform memory 20 in greater detail. Generator 18 includes a crystal controlled clock 36 operated at approximately 4 megahertz or $2^{22}$ hertz. Clock 36 drives a 22 bit adder 38 which is a parallel bit adder having a first input coupled to the output of frequency register 16 and a second input coupled to the full output of a 22 bit accumulator 40. The output of adder 38 in turn is coupled to the input of accumulator 40 whose eight most significant bits are coupled to the address input of waveform memory 20. Thus, it can be readily appreciated that the contents of register 16 are added to the contents of accumulator 40 at a rate determined by clock 36 with the overflow rate of accumulator 40 being the base or selected frequency of the tone to be generated. The eight most significant bits of accumulator 40 then provide a periodic address which are generated at 256 times the base frequency. The group repetition rate of the 256 addresses is the base frequency which is equal to the binary contents of register 16.

For example, if the contents of register 16 is the binary number for 1, 1 will be added into the contents of accumulator 40, $2^{22}$ times before contents are overflowed, or in other words before the eight most significant bits of accumulator 40 are cycled from zero to 256 once. According to the clock rate of clock 36 this will require one second. Thus, a binary 1 in register 16 will generate a 1 hertz signal. That is, the 256 accessed memory locations within memory 20 represent one complete cycle of the tone to be generated, which in the example given will be read from memory 20 during one second. If a binary 2 is placed in the memory of register 16, one-half second will be required at the illustrated clock frequency in order to generate all 256 addresses in the eight most significant bits of accumulator 40. In other words, a 2 hertz signal will be generated. Thus, a tone will be generated having a frequency which is equivalent to the value of the binary number stored within register 16. In the presently illustrated embodiment register 16 includes 16 bits loaded in 2 bytes from microprocessor 10 in order to have sufficient word length to span the musical frequency range with the desired frequency resolution.

The advantage of the circuitry of FIG. 2 provides direct conversion between the binary number stored within frequency register 16 and the frequency of the tone which is generated. In addition, no high frequency oscillators are required as would be the case if the standard counter were used to address the waveform memory. For example, assuming that 10,000 hertz is the highest signal to be generated and given that the human ear can only distinguish 0.2% changes in frequency, the next lowest frequency distinguishable by the human ear would be 9,980 hertz. If a clock frequency were divided by an integer and the minimum change in detectable frequency was to be obtained by incrementing the integer divisor by one, it can be verified that the clock frequency would be 4.96 megahertz. However, it must be recalled that during each cycle of the generated tone, 256 address locations must be accessed. In other words, addresses would have to be generated by conventional countdown counter at 256 times this rate which would necessitate a base clock frequency driving the counter of approximately 1.25 gigahertz. While not unobtainable, such frequencies can only be designed by complicated and expensive circuitry. The problem is of course further exaggerated if a frequency response higher than 10 kilohertz is required.

Referring now to FIG. 1B it may be seen how the binary numbers synchronously coupled to busses 22, 28 and 30 are converted to an audible signal. Each of the busses 22, 28 and 30 are coupled to a conventional digital-to-analog converter 42, 44 and 46 respectively. Digital-to-analog converters marketed under the trademark Zeltex ZD430E are suitable and may be satisfactorily employed in the circuit of the present invention. The outputs of converters 42 and 44 are coupled to the inputs of a conventional analog multiplier 48, such as a device marketed under the trademark Analog Devices AD533. The output of converter 46 may be coupled to a conventional summing circuit 50 whose other input is coupled to a calibrated gain control circuit 52 which provides a calibrated potential to one other input of analog summing circuit 50. The output of summing circuit 50 is coupled to the input of a conventional antilog circuit 54. The outputs of antilog generator 54 and analog multiplier 48 are coupled to the inputs of a second analog multiplier 56. The output of multiplier 56 is the product of the waveform as dictated by a waveform memory 20 modulated by the envelope as dictated by envelope register 24 and multiplied exponentially by the contents of amplitude register 26 combined with a calibrated gain in order to match the exponential amplitude response of the human ear. The output of multiplier 56 may be buffered and provided as an output to an audio tape recorder or coupled through a conventional audio gain control circuit 58, power amplifier 60 and audio speaker 62.

FIG. 1C shows the input/output and real time display of the circuit of the present invention which allows the circuitry to be practically used as a real time composer and allows user programmability and operation of the musical sequences which are played. In the presently illustrated embodiment, data may be input to microprocessor 10 through an addressable input/output port 64 which may in fact be part of the microprocessor chip itself. The input to port 64 is provided by an input/output data bus 66 derived from the output of conventional multiplexer 68. The inputs to multiplexer 68 may include a plurality of manually positional thumb wheels 70, a plurality of push buttons 72 coupled through conventional debounce and interrupt generator circuitry 74 and a plurality of rotary mode switches 76.

However, it must be understood that many of the conventional and well known means for manually inputting data may be employed and are included within the scope of the present invention, such as a conventional piano type keyboard with a plurality of stop switches simulative of an organ. Multiplexer 68 may also be provided with a data input from a serial memory such as a magnetic tape from a conventional tape input/output buffer 78 coupled by a bidirectional bus 80 to a magnetic tape recorder 82. IO tape buffer 78 may be coupled to multiplexer 68 by a data out bus 84 thereby allowing a program and preselected data to be loaded into memories 30 and 20 under the control of processor 10. Input/output buffer 78 is controlled in a conventional manner by a record control bus line 86 derived from control register 34 shown in FIG. 1A. Similarly, register 34 may also provide appropriate tape drive commands to recorder 82 via a tape drive bus 88. The internal semiconductor memory may be expanded to include a serial magnetic memory by providing a tape data-in bus 90 to input/output buffer 78 from an addressable tape register 92 coupled to processor 10. Thus, the approximate 100 tone capacity of main memory 32 may be easily expanded by a serial tape memory having input and output capabilities to an excess of 10,000 consecutive tones. The memory capacities illustrated are shown only for the purposes of example and it must be understood that larger or smaller capacity memories, both dynamic and static, may be included within the system's circuitry according to conventional design principles.

Multiplexer 68 is controlled by an address and interrupt bus 94 which is derived from an addressable output port 96 appropriately coupled to address bus 14 and data bus 12 of microprocessor 10. Again, port 96 may in fact be included as part of microprocessor 10 itself. Finally, as is well known to the art, the operation of processor 10 may be interrupted by both non-maskable and maskable interrupt signals which may be derived from a conventionally designed debounce and interrupt generator 74 in accord with user activation of any one of selected push buttons 72 or by virtue of an appropriate flag being set in an input/output tape buffer 78.

In order for the user to manipulate and program a sequence of tones to use the circuitry of the present invention as a practical composer, it is necessary both for the user to selectively access any given tone in the sequence and to be able to read the parameters associated with that tone. FIG. 1A shows in diagrammatic block form circuitry for providing a plurality of seven bar digit displays indicative of frequence, waveform, envelope type, envelope attack, sustain, and the decay intervals, space intervals between tones, amplitude, and block number and position of any given tone within the accessible memory of the circuitry. Data for display is addressably coupled to conventional display data register 98 whose output is coupled to a scanning display and driver circuit 100. Synchronization and control of circuit 100 is provided through a conventional addressable control register 102 also appropriately coupled to data bus 12 and address bus 14 of processor 10. The output of display circuitry 100 is coupled to a plurality of seven bar light emitting diode display devices 104. Appropriate error circuitry 106 may also be coupled to control register 102.

Greater detail of display circuitry 100 is shown in FIG. 3. The data is coupled from display register 98 to a conventional BCD-to-seven bar decoder and driver 108. The output of decoder and driver 108 is appropriately coupled to the plurality of display devices 104. Inasmuch as all the display devices must be continuously and simultaneously illuminated they are serially scanned in synchronization with the data output from register 98. Since the time during which any single display device is powered is divided among the other displays during the scan interval, each display must be illuminated with a proportionately higher intensity to provide satisfactory illumination levels. For example, in the case where 12 digits are simultaneously displayed each display device will have to be illuminated at approximately 12 times the continuous power or illumination level in order to achieve the same average brightness in the pulsed mode as the device is designed for the continuous display mode. Inasmuch as the higher power or illumination levels are overdriven states with respect to the continuous power level, if microprocessor 10 should be halted for any reason and the displays cease to be scanned, one display device could remain powered for a substantially continuous period at the overdriven level. This of course would ultimately result in permanent damage to the display device.

Thus, according to the present invention the pluralities of display devices 104 are independently scanned by a conventional phase lock loop oscillator 110 which has its phase reference input coupled to control register 34. The output of oscillator 110 is coupled to the clock input of the conventional counter 112. Counter 112 is also provided with a synchronization input coupled by line 114 to register 34. The appropriate outputs of counter 112 are coupled to a multiplexer 116 which provides the display enable signals to selectively enable each of display devices 104 in a serial manner as controlled by counter 112. Should microprocessor 110 go into the halt state or otherwise fail, the phase reference and synchronization signals from register 34 will become static. However, since phase lock loop oscillator 110 is free-running, it will continue to drive the clock input of counter 112 thereby allowing displays 104 to be continuously scanned. When processor 10 comes back on-line, oscillator 110 and counter 112 will agains be synchronized and locked to processor 10 and will scan displays 104 synchronously with the sequence of data coupled through display register 98.

The operation of the present invention may now be understood. It is not necessary for the user to be able to play a musical sequence inasmuch as the parameters of the tones, amplitude, frequency, waveshape and envelope, are manually selected or programmed through the inputs. An understanding of the theory of music or psychological of perceived sound is required rather than the ability to perform music. The circuitry of the present invention then plays the programmed sequence of musical tones according to the parameters which were entered by the user. The tones are stored and may be replayed and selectively reaccessed to permit manipulation. In this manner a musical selection may be scored and rescored until the desired sound is achieved.

In the presently illustrated embodiment processor 10 is configured to operate in one of a plurality of modes according to the manually set position of a rotary mode switch 76.

In the Enter mode a tone sequence number using an appropriate manual input 70 is assigned and the frequency, amplitude, waveform, envelope and envelope time parameters such as attack, sustain and decay, are also entered for the given tone through the appropriate manual inputs 70. Tone spacing is selected with another space input or thumbwheel. After all the parameters and spacing has been assigned to the given tone, an enter tone push button is depressed to command processor 10 to appropriately enter the tone into memory. The entered parameters will then be displayed in the plurality of display devices 104. The tone may then be remanipulated or a subsequent tone entered and stored in main memory 32 by manual assignment of the next tone assignment number. Tones may be entered in any sequence since processor 10 will read the tones from main memory in the numerical order of their addresses regardless of order of entry.

When switch 76 is placed in the Single Sequence mode, a single sequence of tones will be output. Thus, the operator inserts the starting tone assignment number by manipulation of the appropriate thumbwheel 70 and inserts the desired number of tones in another one of the thumbwheels 70. Activation of a start sequence push button will then cause the selected sequence of tone patterns to be played. When switch 76 is set in the Continuous Sequence mode, the sequence of tones selected by the user as described above will be continually repeated.

When switch 76 is rotated to the Single Sequence Tape On position, a single sequence of tones may be played after tape recorder 82 has been appropriately loaded with the sequence. The output pattern which will be read from recorder 82 is identified by a block number, tone assignment number and record length thumbwheels included in the plurality of thunmbwheels 70. The Single Sequence Tape On mode is similar to the Single Sequence mode described above except that the starting point of the tone record is defined by the double parameters of a tape block number and tone assignment number rather than a single tone assignment number. Since up to 100 blocks may be stored on the tape and each block includes 100 tones which may be loaded into main memory 32, the serial tape memory described in the illustrated embodiment will permit the output of sequences of up to 10,000 distinct tones.

The tape is loaded through recorder 82 by setting mode switch 76 to a Load Tone Tape position. After a sequence of tones has been entered into main memory 32 as described above, this sequence may be transferred in digital form to tape recorder 82 for nonvolatile storage. Storage is accomplished by first verifying that the tape is rewound to an initial position. The block number is manually selected and recorder is set in a Record mode by depression of an appropriate push button switch 72. A start tape push button switch causes processor 10 to scan the tape to avoid overriding previously recorded tape blocks. The tone sequence stored within main memory 32 is then written into the appropriate block assigned by the user.

The microprocessor program is also loaded into the initialized or reset microprocessor through the tape input/output. A separate push button keyboard is provided among the plurality of push buttons 72 for providing processor 10 with an identification number which will load the program within an appropriate location in the system memory. The operation of microprocessor 10 is dictated by a plurality of subroutines, many of which are cross-referenced to each other and which are called forth according to manually entered instructions as dictated by switches 70, 72 and 76. Thus, according to the user's input, one or more particular subroutines are called forth from memory and are executed by microprocessor 10 according to conventional software design principles well known to the art. Attached and incorporated into this specification is an APPENDIX filed herewith, made of record in the Patent and Trademark Office files, which illustratively shows the flow diagrams for 32 subroutines used in the illustrated embodiment together with a memory mapping of the system memory. TABLE 1 below provides a Table of Contents to this APPENDIX and illustrates the types of subroutines which may be used to execute the above operational modes using the circuitry as described in connection with the present invention.

count by software programming. In addition, using the circuitry of the present invention, and appropriate software programming, it would be possible to computer analyze the range of tones from any given instrument to obtain a plurality of digital waveform parameters. These parameters would then be stored within memory and called forth by subroutine identification of the appropriate instrument and tone frequency. Thus, what has been described is a sound synthesizing system capable of synthesizing electronic or musical simulative tones and providing a user manipulatable playback for applications which include the scientific and entertainment industries.

I claim:

1. A circuit having an input means for receiving instructions, an output data bus, and output means for generating an audible tone, said circuit for the synthesization of a plurality of audible tones comprising:

a central processor coupled to said input means for transferring and manipulating digital information in a selectively controlled and timed sequence;

TABLE 1

SOUND SYNTHESIZER SOFTWARE FLOW CHARTS
TABLE OF CONTENTS

| Page 1-9 | Memory Map | | |
|---|---|---|---|
| Page | I.D. No. | Start Addr. | Routine/Subroutine |
| 10 | 1 | 0200 | ATTACK, SUSTAIN, DECAY, AND SPACE |
| 11 | 1A | 0260 | ENVELOPE TIMER |
| 12 | 1B | 0294 | DELAY TIMER |
| 13 | 2 | 02D1 | CONVERSION |
| 14 | 2A | 02B6 | BCD TO BINARY |
| 14 | 2B | 02C5 | BINARY TO BCD |
| 15 | 3A | 0350 | GENERATE MULTIPLEXER ADDRESS |
| 16 | 3B | 0370 | MULTIPLEXER SCANNER |
| 19 | 3C | 03B9 | STORE MULTIPLEXER DATA |
| 20 | 3D | 0430 | GENERATE TABLE POINTER |
| 21 | 3E | 0466 | TRANSFER TONE TABLE |
| 26 | 3F | 0454 | ENTER TONE |
| 27 | 3H | 0417 | DISPLAY SCAN |
| 28 | 4 | 03E3 | TURN ON ERROR LIGHT |
| 29 | 6A | 04B6 | OUTPUT TONE |
| 30 | 6B | 04E9 | OUTPUT TONE SEQUENCE |
| 32 | 6C | 0540 | INITIALIZE BACKGROUND |
| 33 | 7A | 055D | INTERRUPT HANDLER |
| 35 | 7B | 05B5 | ACKNOWLEDGE ALL |
| 36 | 7C | 05A9 | BLANK AND FREQUENCY/BLANK |
| 37 | 8 | 05DA | SEQUENCER |
| 38 | 9 | 0600 | INITIALIZATION/RESET |
| 40 | 10J | 0740 | TAPE INTERRUPT HANDLER |
| 41 | 10K | 072F | CONVERT BLOCK NUMBER TO BINARY |

Many alterations and modifications may be made by one having ordinary skill in the art without departing from the spirit and scope of the present invention. For example, the illustrated embodiment shows a monophonic tone synthesizer which is capable of generating a single series of musical tones. By replication of portions of the disclosed circuitry relating to the tone generation together with appropriate software additions by application of conventional design principles in light of the above disclosure, a polyphonic sound synthesizer could be fabricated. Similarly, preprogrammed waveshapes, envelopes and pitch modulation characteristics could be added by including stops and stops circuitry which would call up dedicated subroutines. In addition, preprogrammed rhythm patterns could be superimposed and more complex natural musical qualities, such as frequency glides to frequency modulate a tone signal, or to provide intertonal modulation, that is to modulate a given tone to a degree and extent determined by the preceding serial tones, could be easily taken into aca frequency register coupled to said central processor for storing a tone number indicative of one of said plurality of audible tones;

frequency/address generator means for generating a plurality of addresses at a rate in response to said tone number, said frequency/address generator means including digital integrating means for generating an increment in address by integrating said tone number over time and generating said increment when integration of said tone number equals a predetermined magnitude, said frequency/address generator means being coupled to said frequency register;

waveform memory means for storing and writing a plurality of binary numbers indicative of waveform on said output data bus, said frequency address generator means being coupled to said waveform memory means, said waveform memory means writing said plurality of binary numbers in response to said plurality of addresses, said data bus being coupled to said output means, said output means generating one of said plurality of audible tones in response to said plurality of binary numbers coupled thereto, whereby tone frequency is determined by the rate at which said waveform memory means is collectively read and waveshape is determined by the stored contents of said waveform memory means.

2. The circuit of claim 1 wherein said frequency/address generator means and said digital integrating means includes:

a clock circuit;

a parallel bit adder circuit having a first input coupled to said frequency register said parallel bit adder being clocked by said clock circuit; and an accumulator having an output coupled to a second input of said adder circuit and having an input coupled to the output of said adder, a selected portion of said accumulator providing said addresses, wherein said tone number stored in said frequency register is added to said accumulator at a rate determined by said clock circuit, said selected portion of said accumulator being activated at a rate determined by the magnitude of said tone number.

3. The circuit of claim 1 further comprising:

an amplitude register coupled to said central processor; and an envelope register coupled to said central processor, wherein said amplitude register stores a binary number indicative of the amplitude of one of said plurality of tones, wherein said envelope register stores a binary number indicative of the wave envelope of said one of said plurality of tones, wherein said amplitude register and envelope register are each coupled to said output means.

4. The circuit of claim 1 further comprising display means for displaying a selected one of a plurality of binary numbers is response to control from said central processor wherein said display means includes and is continuously scanned by a phase locked loop oscillator synchronized with said central processor, whereby said displays means continues to scan a display output even though said central processor is halted.

5. A circuit for synthesizing a plurality of audible tones comprising:

input means for providing a plurality of inputs;

output means for generating a plurality of audible tones;

a central processor for selectively transferring and manipulating binary information, said central processor coupled to said input means and to said output means;

a main memory coupled to said central processor for selective storing binary numbers for transfer and manipulation by said central processor;

display means for visually displaying a selected binary number in response to control from said central processor;

a frequency register coupled to said central processor for storing a tone number indicative of the frequency of one of said plurality of audible tones;

a waveform memory for storing a plurality of binary numbers indicative of the waveform of said one audible tone;

an envelope register for storing a binary number indicative of the envelope of said one audible tone;

an amplitude register for storing a binary number indicative of the amplitude of said one audible tone wherein said frequency register, waveform memory, envelope register and amplitude register are each coupled to said central processor and responsive thereto; and an integrator circuit coupled to said frequency register for temporally integrating said tone number and for producing a plurality of sequential address signals;

wherein said waveform memory, envelope register and amplitude register are each coupled to said output means, whereby a plurality of complex audible tones may be arbitrarily programmed and manipulated, and the frequency, waveshape, envelope and amplitude of each of said tones being independently and arbitrarily manipulatable.

6. The circuit of claim 5 wherein said output means includes:

a plurality of digital-to-analog converters, one said converter being coupled to each said waveform memory, envelope register and amplitude register to generate an analog waveform signal, envelope signal and amplitude signal respectively;

an antilog generator coupled to said converter for generating said amplitude signal, said antilog generator for generating the antilog of said amplitude signal;

a first analog multiplier circuit coupled to said converters for generating said waveform and envelope signals, said first analog multiplier circuit for generating a first product signal of said waveform and envelope signals;

a second analog multiplier circuit having inputs coupled to said first multiplier circuit and antilog generator, said second analog multiplier circuit for generating a second product signal of the outputs of said first multiplier and antilog circuits; and means coupled to said second multiplier circuit for amplifying and converting said second product signal to an audible tone.

7. The circuit of claim 6 wherein said output means further comprises a calibrated gain control circuit for selectively generating a constant predetermined analog signal, and a summing circuit for adding said amplitude signal to said constant predetermined analog signal and for coupling said added signals to said antilog generator.

8. The circuit of claim 5 wherein said input and output means includes a serial input/output memory means for providing a serially accessible expanded memory accessible to said central processor.

9. The circuit of claim 5 wherein said input means includes means for providing manually set binary numbers indicative of frequency, amplitude, waveform type, envelope type, envelope attack interval, envelope sustain interval, envelope decay interval, space interval of said audible tone and sequence number of said audible tone.

10. The circuit of claim 5 wherein said display means includes means for scanning said visually displayed and selected binary number independent of the status of said central processor.

* * * * *